INVENTORS.
GEORGE BRUCK
WILLIAM R. HARTER.
IRVIN M. WILBUR.

BY Alden D. Redfield
Norman J. O'Malley
ATTORNEYS.

INVENTORS.
GEORGE BRUCK
WILLIAM R. HARTER.
IRVIN M. WILBUR.
BY Alden D. Redfield
Norman J. O'Malley
ATTORNEYS.

United States Patent Office 2,798,160

Patented July 2, 1957

2,798,160

POWER SUPPLY CIRCUIT USING CONTROLLABLE ELECTRON SOLID STATE DEVICES

George Bruck, William R. Harter, and Irvin M. Wilbur, Cincinnati, Ohio, assignors to Avco Manufacturing Corporation, Cincinnati, Ohio, a corporation of Delaware Application March 2, 1955, Serial No. 491,745

7 Claims. (Cl. 250—36)

This invention relates generally to power supply circuits and, more specifically, to electronic inverter type power supply circuits using controllable solid state devices.

Voltage transformation from one direct current voltage to another but higher direct current voltage involves problems which in the past have been solved, to some extent, by vibrators of the mechanical type having a plurality of make-and-break contacts and other moving parts acting in conjunction with rectifiers. Being mechanical, such vibrators inherently involve problems of bearing surface wear, inertia of moving parts, and other factors tending to limit the vibrational frequency range. In addition, contact bounce and arcing not only limit the useful life of the unit, but also act as an undesirable source of radio frequency noise. It has long been considered desirable to replace mechanical vibrators with electronic means, such as vacuum tubes (including gas-filled tubes), semi-conducting devices, or other physical means of a non-mechanical nature capable of controlling electron current flow.

Where the voltage source is sufficiently high, vacuum tube circuits are capable of handling relatively large amounts of power in an efficient manner. However, vacuum tubes of known types, which are capable of relatively low voltage operation, supply very limited amounts of current, and though gas tubes can be used in the low voltage range to control larger amounts of current, they require special precautions to be taken since, ordinarily, gas tubes alone can only initiate current flow. By special circuitry, it is possible to control gas de-ionization in the tube and thus control the current flow period. However, gas tubes are invariably noisy and thus leave much to be desired in many applications.

It is an object of this invention to provide a soild state electronic device which is capable of inverting a relatively low voltage direct current with very high efficiency.

It is a further object of this invention to provide an electronic solid state device capable of operating from a relatively low voltage direct current with very high efficiency.

It is a further object of this invention to provide an electronic solid state device capable of operating from a relatively low direct current voltage and producing a higher direct current voltage with low internal power loss and a minimum number of components.

It is a still further object of this invention to provide an electronic solid state device without moving parts, having relatively low noise-generating characteristics for connection between a low voltage direct current source and a unit requiring power at a higher direct voltage.

Figure 1:
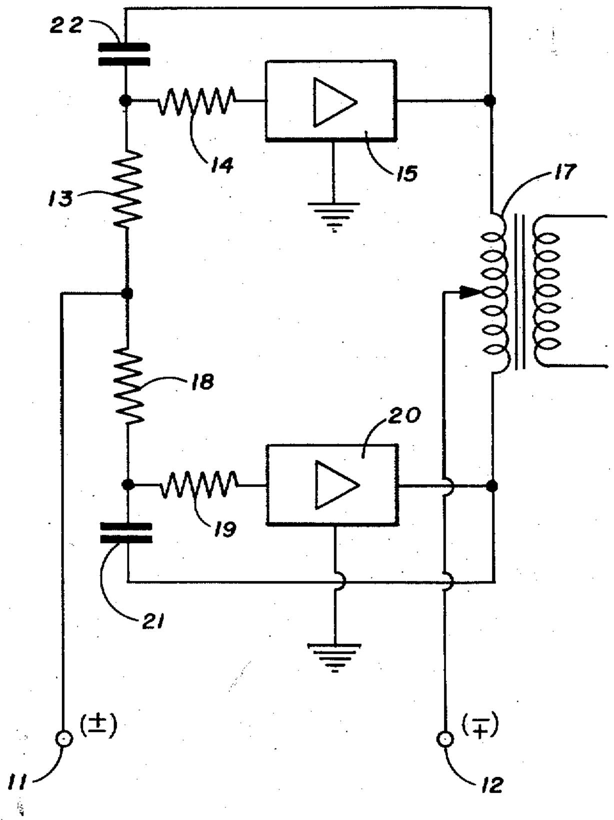
Figure 2:
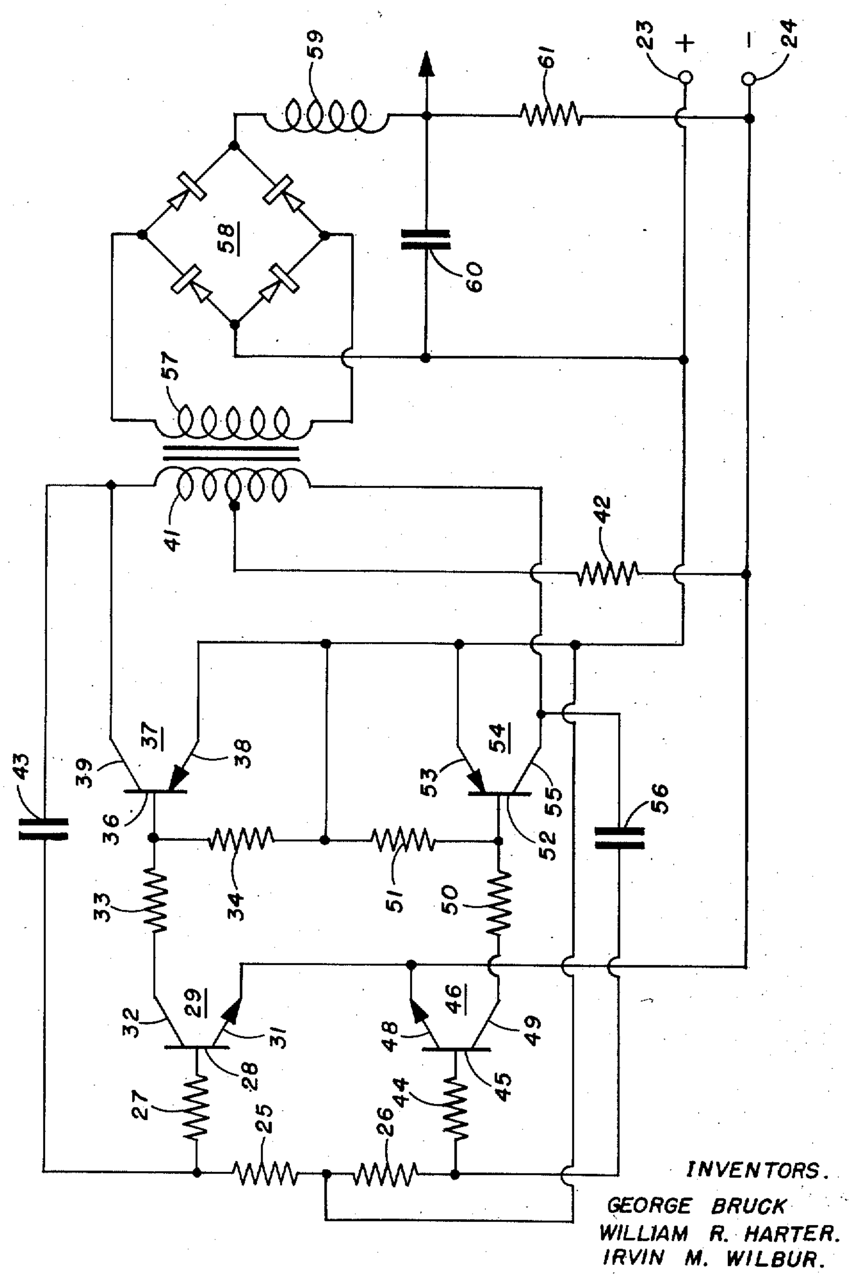

For a better understanding of the present invention, together with other and further objects, advantages and capabilities thereof, reference is made to the following disclosure and appended claims in connection with the accompanying drawings, in which:

Fig. 1 is a schematic circuit diagram of the electronic solid state inverter, and Fig. 2 is a schematic circuit diagram of an inverter using semi-conductor devices.

Briefly, the invention comprises a source of direct current supply which feeds through two substantially symmetrical paths in parallel to opposite ends of a transformer primary having a center tap connected to one side of the direct current supply. Each parallel path contains a controllable solid state electron conduction device capable of passing or blocking electron flow under control of a time constant feedback circuit as to its conduction period, and under control of the other parallel path as to its non-conduction period.

The general circuit of Fig. 1 comprises a pair of input terminals 11 and 12 which are to be connected to a source of power, not shown. It can be seen that the remainder of the circuit is symmetrical, the upper conduction path comprising a series circuit including resistance 13, resistance 14, solid state amplifier 15, and the upper half of transformer primary 17. Symmetrically, the lower conduction path also comprises a series circuit including resistance 18, resistance 19, solid state amplifying device 20, and the lower half of transformer primary 17.

Timing capaictor 22 is connected between the output of amplifier 15 and the junction of resistances 13 and 14. Timing capacitor 21 is connected between the output of amplifier 20 and the junction of resistances 18 and 19.

Circuit operation can be understood best by assuming that the circuit of Fig. 1 is slightly asymmetric in that one or the other of the conduction paths will tend to pass current when the unit is connected across a current source. Thus, if it be assumed that both capacitors are charged up to the voltage of the source connected between terminals 11 and 12, that current is flowing through amplifier 15, and that the output of each amplifier is in phase with the input, it can be seen that current will flow from the positive power supply terminal 11 through resistances 13 and 14, amplifier 15, and the upper half of transformer primary 17, back to the negative supply terminal 12. The charge built up on capacitor 21 makes the capacitor terminal connected to the junction of resistances 18 and 19 positive relative to the capacitor terminal connected to the output of amplifier 20. Capaictor 22, at the start of circuit operation, carries a similar charge, but while amplifier 15 is conducting, this capacitor is being discharged by conduction through resistance 14 and amplifier 15. During this period, i. e., the conduction period of amplifier 15, the lower half of primary winding 17 is strongly negative relative to the center tap, due to current flow through the upper half of winding 17 and autotransformer action. Thus, the voltage at the junction of resistances 18 and 19 can rise no further than the voltage of the power source connected between terminals 11 and 12.

As the potential on the winding 17 side of capacitor 21 goes negative, capacitor 21 is further charged through resistance 18 by current flow out of power source terminal 11. The final charge on capacitor 21 is then governed not only by the voltage of the direct current power source, but also by the voltage drop across the lower half of winding 17 which is connected along with the power source across capacitor 21 in series-aiding polarity.

As capacitor 22 discharges, the voltage at the junction of resistances 13 and 14 starts to drop, and thus the current flow through the input of amplifier 15 starts to drop. When input current drops to a given level, conduction through amplifier 15 starts to decrease, dropping the voltage at the upper terminal of transformer winding 17 and slightly raising the voltage at the lower terminal of the transformer winding. This action raises the potential at the junction of resistances 18 and 19 and at the input of amplifier 20 and starts conduction through the lower path. As a result, the lower terminal of primary winding 17 goes further positive, regeneratively feeding back a stronger positive voltage through capacitor 21 to the input of amplifier 20 to open up the amplifier and start strong current flow through the lower conduction path.

Through autotransformer action, when the lower terminal of transformer winding 17 goes positive, the upper terminal of the winding goes negative, further decreasing current flow through resistance 14 and the input of amplifier 15 and tending to block conduction through the upper path. As can be seen, regenerative feedback in both paths emphasizes this instability, so that amplifier 20 is rapidly driven into full conduction and amplifier 15 is rapidly driven essentially to cutoff. Once this condition obtains, capacitor 22 in the upper path starts its charging cycle and capacitor 21 in the lower path starts its discharging cycle to time-out the open or conduction period of amplifier 20.

Capacitor 22 sees a charging source comprising the voltage of the power source coupled across terminals 11 and 12 and the voltage drop in the upper portion of winding 17 which at this instant is coupled in aiding polarity. While capacitor 22 is charging, capacitor 21 is discharging toward the potential of the direct current power source. At the start of conduction through the lower path of amplifier 20, the charge on capacitor 21 is more than sufficient to supply the input current for driving amplifier 20 into full conduction. Thus, as capacitor 21 discharges, for a given selected period it maintains a charge sufficient to hold amplifier 20 at maximum conduction. Once the charge across capacitor 21 drops to a point where conduction through amplifier 20 tends to decrease, the circuit is again made unstable.

Through regenerative feedback action, amplifier 20 is rapidly driven to essentially cutoff, which raises the potential at the upper terminal of primary winding 17 and starts current flowing into the input of amplifier 15, opening the upper path to a maximum conduction. It can be seen that as amplifier 15 starts to conduct, it automatically raises the potential of the upper end of winding 17 which, in turn, is reflected back through capacitor 22 to the input of the amplifier so as to regeneratively increase current flow in the upper path.

It now should be apparent that the timing circuit associated with each of the two parallel conduction paths basically acts to time out the conduction period of its associated amplifier and establish the instant when the associated amplifier is driven into non-conduction. The length of the non-conduction period of each parallel path is established by the time constant circuit in the other path. Thus, the non-conduction period of amplifier 15 is controlled by the time constant circuit of amplifier 20 including capacitor 21, and when capacitor 21 discharges to a voltage which tends to decrease current flow in amplifier 20, the upper conduction path is signalled into conduction by a current decrease from the output of amplifier 20 which is magnetically and capactively coupled to present a current increase at the input of amplifier 15.

During non-conduction periods the solid state amplifiers 15 and 20 pass little, if any, current. Thus, there is essentially no power loss in either amplifier during these periods. Some solid state conducting devices have exceptionally low resistance conduction paths. By selecting such a unit, it is possible to minimize power loss during conduction periods. Thus, if it were possible to operate a device, as shown in Fig. 1, so as to produce a perfect square wave output, it would be possible to operate at very close to 100% efficiency. However, due to the fact that amplifiers 15 and 20 do not instantly assume either a conductinfig or a non-conducting condition, there is a power loss in the amplifiers during the switching periods. With solid state conducting devices presently available in the form of transistors, circuits have been built with 75% to 97% efficiency.

The preferred embodiment of a solid state electronic power supply using transistors is shown in Fig. 2. Terminals 23 and 24 are supplied for connection to a relatively low voltage power source, not shown. The positive terminal 23 is coupled to the junction of two resistors, 25 and 26. The other end of resistor 25 is connected through resistance 27 to the base electrode 28 of an NPN transistor 29. The emitter electrode 31 of transistor 29 is coupled directly to terminal 24, or the negative terminal of the power source. Collector electrode 32 is coupled through two resistances, 33 and 34, back to positive terminal 23. The base electrode 36 of a PNP type transistor 37 is coupled to the junction of resistances 33 and 34, while the emitter 38 is coupled directly to the positive power source terminal 23. Collector electrode 39 of transistor 37 is coupled through the upper half of a primary winding 41 and resistance 42 back to the negative power source terminal 24. Capacitor 43 is coupled between collector 39 of transistor 37 and the junction of resistances 25 and 27 for feeding back information to transistor 29.

Symmetrically, the lower half of the circuit comprises a resistance 44 which is coupled between the base electrode 45 of NPN transistor 46 and resistance 26. The emitter electrode 48 of transistor 46 is coupled directly to negative power source terminal 24, while collector electrode 49 is coupled through resistances 50 and 51 back to the positive power source terminal 23. The base electrode 52 of a PNP transistor 54 is coupled to the junction of resistance 50 and resistance 51, and collector electrode 55 is coupled through the lower half of primary winding 41 and resistor 42 back to negative power source terminal 24. A feedback capacitor 56 is coupled between collector 55 of transistor 54 and the junction of resistances 26 and 44.

The alternating current output of the unit is taken from across secondary winding 57 and fed through a full wave bridge type rectifier circuit 58. Coil 59 and capacitor 60, which are coupled between the output of rectifier 58 and load 61, act as a filter network. It will be clear to those skilled in the art that type of transistor used, i. e., NPN type or PNP type, depends on circuit polarities and that transistors 29 and 46 might be PNP type while transistors 37 and 54 might be NPN type if polarities were modified.

The circuit of Fig. 2 operates basically in the same manner as the circuit of Fig. 1. Once the power source is coupled across terminals 23 and 24 and capacitors 43 and 56 are charged, one or the other of the parallel paths is driven into conduction due to circuit asymmetry. For example, assume that the upper conduction path is conducting and the lower conduction path is non-conducting. During this period current will flow from the power supply positive terminal 23 through resistances 34 and 33 into collector 32 of transistor 29, out through emitter 31 and back to the negative terminal 24. This condition is maintained by the charge on capacitor 43, which is impressed through resistances 27 and 42 between the base 28 and emitter 31, making the emitter 31 negative with respect to base 28. Since transistor 29 is of the NPN type, the collector 32-emitter 31 path has a very low resistance under these conditions, and the majority of the voltage drop, and thus power loss, is in resistances 34 and 33.

The resultant voltage drop across resistance 34 makes the emitter 38 of transistor 37 positive relative to base 36, causing bias current to flow through the emitter-to-base junction which, in turn, opens the emitter 38-to-collector 39 path to current flow from terminal 23, out through the upper winding of coil 41 and resistance 42, back to the negative power source terminal 24. By virtue of the relatively low impedance of the internal emitter 38-collector 39 path when opened, the upper terminal of primary winding 41 rapidly moves close to the potential of terminal 23.

Thus, the voltage between the junction of resistances 25 and 27 and emitter 31 of transistor 29 moves towards a value which is at least twice the power supply voltage. The resultant increased current flowing through the emitter 31-to-base 28 junction is sufficient to drive the collector 32-emitter 31 circuit into full conduction, drawing current through resistance 33, through resistance 34 and through the emitter 38-to-base 36 junction of transistor 37. The value of resistance 34 is selected so that, under these conditions, sufficient bias current will flow through the emitter 38-to-base 36 junction to drive the collector 39-emitter 38 circuit of transistor 37 into full conduction and effectively apply the positive potential of terminal 23 to the upper terminal of coil 41.

As capacitor 43 discharges, it ultimately reaches a charge condition where it is incapable of supplying sufficient bias current through the junction of emitter 31 and base 28 to hold the collector 32-emitter 31 path of transistor 29 completely open. The resulting decreased current flow through resistance 33 and the emitter 38-base 36 junction of transistor 37 changes the operation condition of the emitter 38-collector 39 circuit of transistor 37, tending to decrease current flow therethrough. As a result, the potential at the upper terminal of primary winding 41 starts moving in the negative direction, and the potential at the lower terminal of winding 41, through autotransformer action, starts moving in the positive direction.

During the conduction period of the upper current path comprising transistors 29 and 37, lower path feedback capacitor 56 not only is charged by the voltage of the power source connected between terminals 23 and 24, but also by the voltage drop across the lower half of primary winding 41 induced therein by upper winding current flow. Thus, at the instant in question, i. e., when primary winding current flow through transistor 37 starts decreasing, capacitor 56, in the lower path, is charged to a voltage higher than the voltage of the power source. Therefore, when current flow through transistor 37 starts decreasing, thereby raising the potential of the lower end terminal of winding 41, the emitter 48-base 45 circuit of transistor 46 sees a bias current supply source at a voltage which is increasing towards a value more than twice the voltage of the power source connected between terminals 23 and 24.

This voltage is polarized so as to make current flow possible through the base 45-emitter 48 junction in sufficient quantity to cause current flow from the positive terminal 23 through resistance 51 and the emitter 53-base 52 junction in parallel therewith, through resistance 50 and the collector 49-emitter 48 circuit back to the negative power source of terminal 24. The current through the emitter 53-base 52 junction of transistor 54 then tends to open the emitter 53-collector 55 internal path of transistor 54 to current flow from terminal 24 into emitter 53, out of collector 55, through the lower half of winding 41 and back through resistance 42 to negative power supply terminal 24. This increases the potential at the lower ending of winding 41 and thus also the bias current flow through the base 45-emitter 48 junction. The complete circuit then becomes unstable, driving transistors 29 and 37 rapidly into a condition of non-conduction and transistors 46 and 54 into a conducting condition.

The switching or transient period is extremely short by virtue of the fact that feedback capacitors 43 and 56 both feed back an output voltage which is in phase with the input voltage of its associated path. Thus, as the output of the upper path goes negative, the bias current through the junction of base 28 and emitter 31 decreases. This, in turn, decreases the output current of transistor 29 which supplies the bias current of transistor 37 so as to decrease the output current of transistor 37. This regeneratively decreases the potential at the upper terminal of winding 41 until the regenerative cycle completely or essentially cuts off the current flow through transistors 29 and 37.

In like manner, when the lower end of winding 41 moves toward the positive potential of terminal 23, by virtue of the feedback path through capacitor 56, there is increased bias current flow through the base 45-emitter 48 junction in transistor 46. This, in turn, increases the bias current flowing through the emitter 53-base 52 junction of transistor 54, making the lower terminal of winding 41 move still closer to the potential of terminal 23. Thus, the lower path regeneratively triggers into a condition of maximum conduction.

Current flow through the lower half of winding 41 during this period makes the upper end terminal of the winding 41 negative relative to its center tap. Capacitor 43, therefore, charges through resistances 25 and 42 towards a voltage which is the sum of the voltage across the power source terminals and the induced voltage in the upper half of winding 41. Depending on the time constant of its discharge circuit, the charge on capacitor 56 keeps supplying sufficient bias current through the base 45-emitter 48 junction to keep the collector 49-emitter 48 circuit of transistor 46 essentially wide open for a given period.

When capacitor 56 discharges to a given level which is insufficient to supply the base 45-emitter 48 bias current necessary to maintain saturated current flow through collector 49 and emitter 48, there is a resulting drop in the bias current supplied through the emitter 53-base 52 junction of transistor 54. This, in turn, decreases the current flow through the emitter 53-collector 55 path of transistor 54, lowering the potential at the lower terminal of winding 41. The unit then immediately becomes unstable, and transistors 46 and 54 are regeneratively triggered toward a condition of non-conduction by action of feedback through capacitor 56.

While the lower parallel path is changing from a maximum conducting condition to its non-conducting condition, the potential on the lower end terminal of primary winding 41 is changing from positive to negative relative to the center tap. The upper end terminal of winding 41, due to auto-transformer action, then starts moving in the positive direction relative to the center tap. The increased voltage between base 28 and emitter 31 of transistor 29 starts increased bias current flowing through the base 28-emitter 31 junction. As a result, current starts to flow from positive terminal 23 through resistance 34 and the emitter 38-base 36 junction in parallel therewith, through resistance 33, through collecter 32 and out emitter 31, back to the negative power supply terminal 24. The bias current through the emitter 38-base 36 junction of transistor 37 opens the collector 39-emitter 38 path to current flow, further increasing the potential at the upper end of winding 41. Inphase regenerative feedback through capacitor 43 then rapidly drives the upper path into a condition of maximum conduction to complete the cycle.

The resulting circuit is a highly efficient inverter type power supply having substantially a square wave output suitable for rectification. Though a square wave peak, once reached, conveys no information indicative of its starting time, by means of the invention disclosed herein, it is possible to utilize a time constant circuit to time-out each wave without restorting to well-known oscillator methods, such as circuits wherein capacitors are placed in parallel with the output. Such a circuit, if used, would destroy the output wave shape. The invention provides a simple and efficient solid state electronic device which inverts relatively low voltage currents to produce a higher current voltage.

While we do not desire to be limited to any specific circuit parameters, such parameters varying in accordance with individual circuit requirements, the following circuit values have been found entirely satisfactory in one successful embodiment of the invention, in accordance with Fig. 2:

Transistors:

| | |
|---|---|
| 29 | X–15 |
| 37 | XPT–27 |
| 46 | X–15 |
| 54 | XPT–27 |

| Resistors: | Ohms |
|---|---|
| 25 | 6,800 |
| 26 | 6,800 |
| 27 | 1,500 |
| 33 | 300 |
| 34 | 100 |
| 42 | 26 |
| 44 | 1,500 |
| 50 | 300 |
| 51 | 100 |
| 61 | 3,000 |
| Inductors: | Henry |
| 59 | .3 |
| Capacitors: | Microfarads |
| 43 | .2 |
| 56 | .2 |
| 60 | 7 |

Power Supply:
24 volts D. C.

While there has been shown and described what is at present considered the preferred embodiment of the invention, it will be obvious to those skilled in the art that various changes and modifications may be made therein without departing from the appended claims.

Having thus described our invention, we claim:

1. In an inverter type power supply, the combination comprising a source of direct current voltage, a load circuit, a pair of solid state controllable electronic square-wave generators coupled between said power source and said load circuit, a separate resistance-capacitance time constant means coupled between the input of each generator and the load circuit for feeding back an inphase amplified version of the input signal.

2. In an inverted type power supply, the combination comprising a direct current voltage source, a transformer having a secondary winding and a primary winding which is center-tapped between two end terminals, means coupling said primary winding center-tap to one side of said direct current voltage source, a pair of solid state electronic square-wave generators, each having an input terminal and each having an output terminal for producing an inphase amplified version of the input signal, means coupling the output terminal of each generator to a separate primary winding end terminal, a separate tapped resistor for each generator coupled between the generator input terminal and the other side of said direct current voltage source, and a regenerative feedback capacitor for each generator coupled between the generator output and a tap on the generator input resistor.

3. In an inverter type power supply, the combination comprising a direct current voltage source, a transformer having a secondary winding and a primary winding which is center-tapped between two end terminals, means coupling said primary winding center tap to one side of said direct current voltage source, a pair of solid state electronic square-wave generators, each having an input terminal and an output terminal, means coupling the output terminal of each generator to a separate primary winding end terminal, a separate tapped resistor for each generator coupled between the generator input terminal and the other side of said direct current voltage source, and a regenerative feedback capacitor for each generator coupled between a tap on the generator input resistor and the primary winding end terminal upon which an inphase amplified version of the generator input signal is impressed.

4. In an inverter type power supply, the combination comprising a direct current voltage source, a transformer having a secondary winding and a primary winding which is center-tapped between two end terminals, means coupling said primary winding center tap to one side of said direct current voltage source, a pair of solid state electronic square-wave generators each having an input terminal and an output terminal, means coupling the output terminal of each generator to a separate primary winding end terminal, a separate tapped resistor for each generator coupled between the generator input terminal and the other side of said direct current voltage source, and a regenerative feedback capacitor for each generator coupled between a tap on the generator input resistor and the portion of the primary winding upon which an inphase amplified version of the generator input signal is impressed.

5. In an inverter type power supply, the combination comprising a direct current voltage source, a transformer having a secondary winding and a primary winding which is center-tapped between two spaced terminals, means coupling said primary winding center tap to one side of said direct current voltage source, a pair of transistor square-wave generators, each having an input terminal and an output terminal, means coupling the output terminal of each generator to a separate one of said primary winding spaced terminals, a separate tapped resistor for each generator coupled between the generator input terminal and the other side of said direct current voltage source, and a regenerative feedback capacitance for each generator coupled between a tap on the generator input resistor and the portion of said primary winding upon which an inphase amplified version of the generator input signal is impressed.

6. A square-wave signal generator comprising a pair of grounded-emitter NPN type transistors each having a base, emitter and collector, a power supply having negative and positive terminals, the emitters of said transistors being connected together and to the negative terminal of said power supply, an inductive load having a center tap, a pair of input resistors connected at a junction, conductive connections between said junction and the positive terminal of said power supply and between said center tap and the negative terminal of said power supply, means coupling the collectors to separate end terminals of said load, and individual resistance-capacitance regenerative feedback networks connected between said end terminals and the bases of said transistors, each of the input resistors being connected to the junction of the resistance and capacitance in one of said networks.

7. A square-wave signal generator in accordance with claim 6 in which said coupling means comprises a pair of grounded-emitter PNP type transistors each having a base, emitter and collector, the emitters of said PNP transistors being connected together and to the positive terminal of said power supply, the collectors of said PNP transistors being individually connected to the end terminals of said load, individual input resistors connected between base and emitter of each PNP type transistor and series resistances individually conductively connected between the collector of each NPN type transistor and the base of its associated PNP type transistor, whereby the NPN and PNP transistors are symmetrically connected in GE—GE cascade with multistage regenerative shunt feedback.

References Cited in the file of this patent

Article: "Transistor Power Supply for Geiger Counters," by Pearlman, pages 144–145 of Electronics for Aug. 1954.

"Degenerative Tandem Amplifier," par. 6.11, pages 120–121 (Fig. 6.12) of "Transistor Circuits" by Shea, pub. Sept. 1953.

"Shunt Type Feedback," par. 16.51, 16.53 and Figs. 16.7 and 16.11 of Shea, pub. Sept. 1953.

UNITED STATES PATENT OFFICE

CERTIFICATE OF CORRECTION

Patent No. 2,798,160 July 2, 1957

George Bruck et al.

It is hereby certified that error appears in the printed specification of the above numbered patent requiring correction and that the said Letters Patent should read as corrected below.

Column 1, line 47, for "soild" read -- solid --; column 2, line 21, for "capaictor" read -- capacitor --; line 40, for "Capaictor" read -- Capacitor --; column 3, line 68, for "conductinfig" read -- conducting --; column 6, line 63, after "higher" insert -- direct --.

Signed and sealed this 1st day of October 1957.

(SEAL)

Attest:

KARL H. AXLINE

Attesting Officer

ROBERT C. WATSON

Commissioner of Patents